(No Model.)
J. B. FRY & J. ZINK.
TUBE CUTTER.
No. 441,479. Patented Nov. 25, 1890.
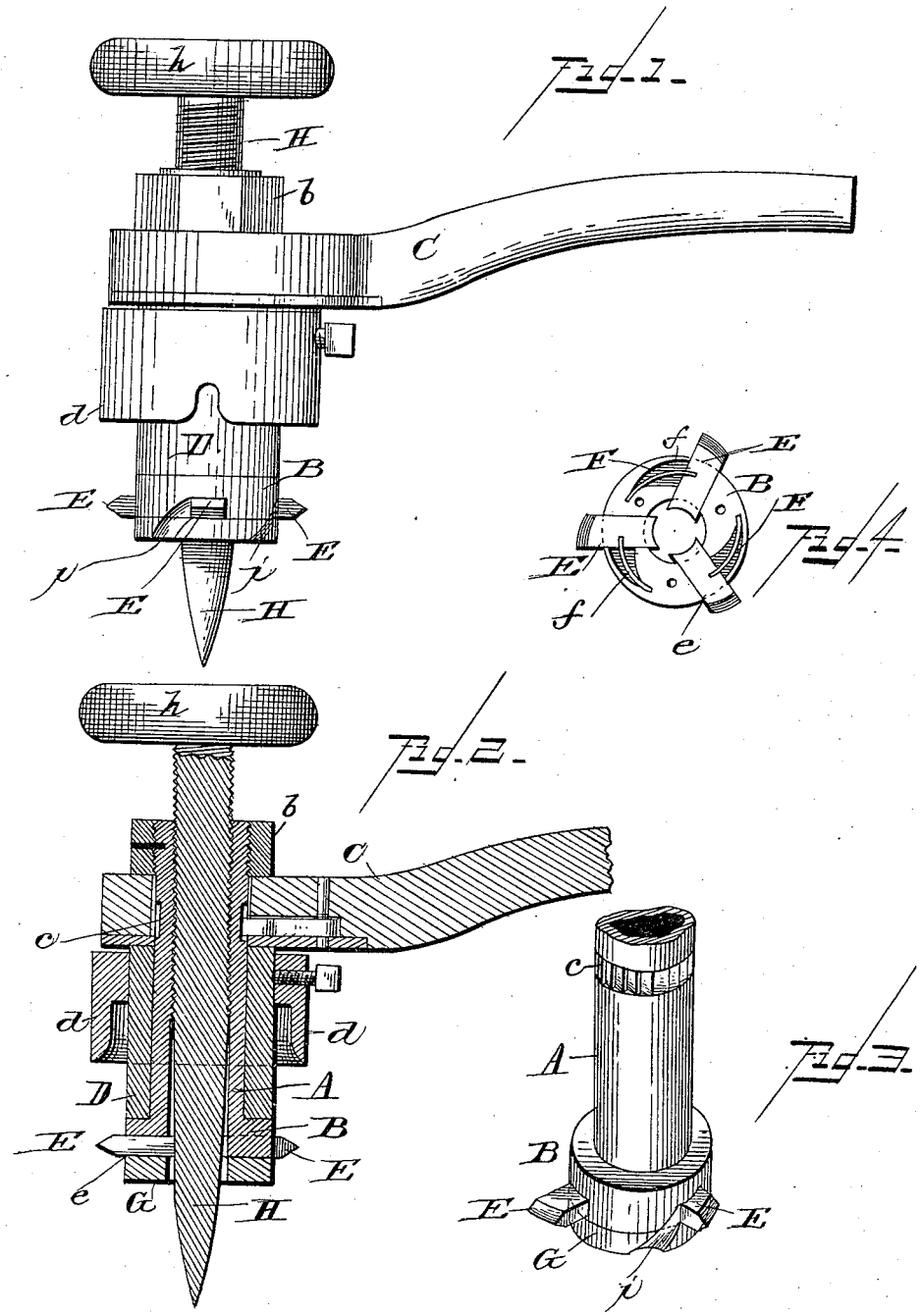
WITNESSES
F. L. Ourand
Van Buren Hillyard.
INVENTOR
James Benton Fry & John Zink.
By R. S. & A. B. Lacey
their Attorneys.

UNITED STATES PATENT OFFICE.

JAMES BENTON FRY AND JOHN ZINK, OF WIGNER, OHIO.

TUBE-CUTTER.

SPECIFICATION forming part of Letters Patent No. 441,479, dated November 25, 1890.

Application filed August 4, 1890. Serial No. 360,973. (No model.)

*To all whom it may concern:*

Be it known that we, JAMES BENTON FRY and JOHN ZINK, citizens of the United States, residing at Wigner, in the county of Gallia and State of Ohio, have invented certain new and useful Improvements in Tube-Cutters; and we do hereby declare the following to be a full, clear, and exact description of the invention, such as will enable others skilled in the art to which it appertains to make and use the same.

This invention relates to cutters for use in cutting tubes or flues from the inside when not accessible from the outside.

The invention is especially designed for cutting the tubes from boiler-heads when it is required to remove them for any reason.

The improvement consists in the novel features which will be hereinafter more fully described and claimed, and which are shown in the accompanying drawings, in which—

Figure 1 is a side view of a cutter embodying our invention. Fig. 2 is a central longitudinal section of the device. Fig. 3 is a perspective view of the cutter-head, showing the spiral clearance-grooves therein. Fig. 4 is a front view of the cutter-head, the cap-plate being removed.

The sleeve A is provided at one end with the cutter-head B, and at its other end with means for rotating it, which may be either an angular head $b$, to receive a wrench or other tool, or a ratchet-lever C, which engages with teeth $c$ on the sleeve A. The guide-sleeve D, mounted on the sleeve A, enters the tube to be cut and forms a bearing for the sleeve A. The flange $d$ fits over and embraces the end of the tube to be cut, and limits the inward movement of the device when applied on the tube.

The cutter-head B is provided in its end with radial grooves $e$, in which are placed radially-sliding cutters E, being held in a retracted position by springs $f$, which have one end secured to the cutter-head and the other end inserted in a notch in the side of the cutter. These springs are placed in recesses F in the cutter-head. The cap-ring G, secured to the end of the cutter-head, covers the recesses F, springs $f$, grooves $e$, and the main portion of the cutters E, and at the same time serves to hold the cutters in place in the grooves $e$ and the springs in place in the recesses F. The inner ends of the cutters are inclined and curved to conform to the tapering end of the feed-screw H, which is adapted to screw into the sleeve A, and which is provided on its outer end with the hand-wheel $h$, by means of which the screw is rotated to advance or retract it in the sleeve A. To give clearance to the cuttings, the cutter-head is provided with the spiral channels $i$, which extend from the cutters to the end of the cutter head or face of the ring G.

The operation of the tool is evident. However, it may be well to state that after the tool is inserted in the tube to be cut the screw H is screwed into the sleeve, thereby forcing the cutters E outward and into the sides of the tube. The sleeve A is now rotated, carrying the cutters around and causing them to cut into the tube. This operation is repeated until the tube is cut through. When the screw is withdrawn, the springs $f$ will retract the cutters.

Having thus described our invention, what we claim, and desire to secure by Letters Patent, is—

1. In a tube-cutter, the combination, with the sleeve A, provided with the head B, the latter having a series of radial grooves $e$ in its end, and having recesses F to one side of and communicating with the grooves $e$, of a series of cutters in the grooves $e$ having their inner ends curved and beveled, the springs located in the recesses F and having one end engaged with the respective cutters and their other ends secured in the inner ends of the recesses, means for rotating the sleeve A and projecting cutters, and the cap-ring G, secured to the end of the head B, substantially as and for the purpose described.

2. The hereinbefore shown and described tube-cutter, composed of the sleeve A, internally threaded and provided with the head B, the latter having radial grooves $e$ and recesses F, means for rotating the sleeve A, as the ratchet-lever C, the guide-sleeve D, mounted on the sleeve A, the flange $d$, secured on the sleeve D, the tapering feed-screw H, screwed in the sleeve A, the cutters E, placed in the grooves $e$ and curved and beveled on their inner ends, the springs $f$ in the recesses F for retracting the cutters E, and the cap-ring G, secured to the end of the head B, substantially as described, for the purpose specified.

In testimony whereof we affix our signatures in presence of two witnesses.

JAMES BENTON FRY.
JOHN ZINK.

Witnesses:
E. J. NEAL,
JOHN SMELTZER.